March 8, 1966  L. R. BEARD  3,238,809
ADJUSTABLE LINK FOR HITCH DEVICE AND UNIVERSAL JOINT THEREFOR
Original Filed Dec. 10, 1962
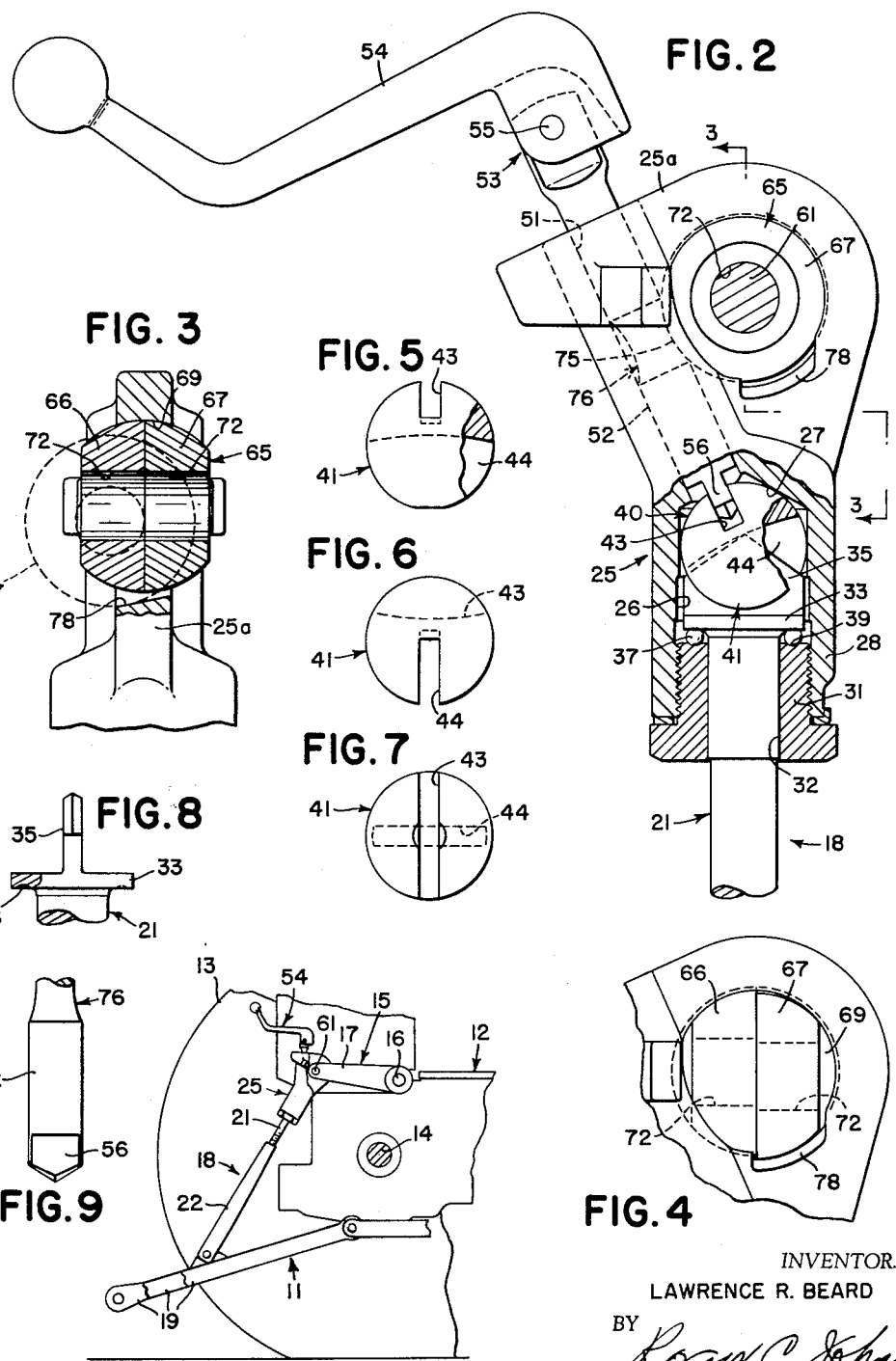
INVENTOR.
LAWRENCE R. BEARD
BY Roger C. Johnson
ATTORNEY

United States Patent Office 3,238,809
Patented Mar. 8, 1966

3,238,809
ADJUSTABLE LINK FOR HITCH DEVICE
AND UNIVERSAL JOINT THEREFOR
Lawrence R. Beard, Waterloo, Iowa, assignor to Deere & Company, Moline, Ill., a corporation of Delaware
Continuation of application Ser. No. 243,430, Dec. 10, 1962. This application Dec. 2, 1964, Ser. No. 416,965
10 Claims. (Cl. 74—504)

This invention relates generally to agricultural implements and more particularly to lifting mechanism incorporated in tractors for raising and lowering implements associated therewith. More particularly, this invention is concerned with adjusting means for shifting one of the lifting links of the hitch mechanism. This application is a continuation of copending application Ser. No. 243,430, filed December 10, 1962, now abandoned.

The object and general nature of this invention is the provision of a simple and economical single ball joint universal type of adjusting mechanism to effect a change in the length of one of the lift links of a tractor-carried three-point hitch. Specifically, it is an important feature of this invention to provide an enclosed ball type universal joint acting between an adjusting crank and a rotatable threaded member forming an adjustable part of one of the lift links of the tractor hitch mechanism.

It is a further feature of this invention to provide an adjusting mechanism for the lift link wherein there are only a few parts and these are so constructed and arranged as to be simple to assemble into an operative structure and economical to manufacture and maintain. Further it is an additional feature of this invention to provide lift link adjusting mechanism wherein the parts are normally held in operative relation within a one-piece housing. Still, further, it is a feature of this invention to provide a ball type pivot between the lift arm of the tractor lift mechanism and the upper portion of the lift link structure, which ball type pivot is so constructed and arranged that it holds certain portions of the adjusting structure in place but can readily be manipulated to provide convenient and easy disassembly of the adjusting mechanism parts.

Still further, another feature of this invention is the provision of a new and simplified universal joint structure especially constructed and arranged to provide for an angular disposition of the adjusting crank means relative to the rotatable lift link member that effects a change in the effective length of the lift link.

These and other objects and advantages of this invention will be apparent to those skilled in the art after a consideration of the following detailed description, taken in conjunction with the accompanying drawings, in which:

FIG. 1 is a side elevation of a rear portion of a tractor having power operated lift means in which the principles of this invention have been incorporated.

FIG. 2 is an enlarged fragmentary side view of the details of the link adjusting mechanism of this invention, certain parts being broken away to show the construction to better advantage.

FIG. 3 is a sectional view taken generally along the line 3—3 of FIG. 2.

FIG. 4 is a fragmentary side view of the upper portion of the universal joint housing, illustrating in particular the manner in which the spherical pivot member, connecting the tractor power lift arm with the housing, may be removed from the housing preparatory to disassembling the lift link adjusting means.

FIG. 5, FIG. 6, and FIG. 7 are different views of the universal joint ball enclosed within the housing.

FIG. 8 is a fragmentary view of the upper end of the rotatable lift link member, showing in particular the upper fin that cooperates with the universal joint ball.

FIG. 9 is a fragmentary view of the crank shaft, showing in particular the ball-engaging fin on the lower end of the crank shaft.

Referring first to FIG. 1, the present invention is shown as incorporated in a hitch linkage 11 with which a conventional farm tractor 12 is provided. The tractor 12 includes rear drive wheels 13 mounted on axle shafts 14, and the tractor is illustrated as provided with power actuated lift mechanism 15, including a rockshaft 16 and a pair of lift arms 17, which are connected through lift link means 18 with a pair of rearwardly extending draft links 19. For convenience of illustration, only one lift link means 18 is shown.

At least one of the lift links 18 is provided with means constructed, according to the present invention, to be adjustable for raising and lowering the associated draft link 19, and the portion of the implement (not shown) connected thereto, relative to the other draft link. According to this invention, the upper member 21 of one of the links 18 is preferably in the form of a rotatable member threaded at its lower end to be adjustable longitudinally of the lower link member 22. The upper portion of the rotatable member 21 is disposed for rotation in the lower portion of an enclosing housing 25 that is disposed in a normally vertical position (FIGS. 1 and 2) having its lower end portion formed with a generally vertical bore 26, the upper portion 27 of which is generally spheroidal in interior configuration. The lower or outer end of the bore 26 is formed with a threaded section 28 in which a flanged bushing 31 is threaded. The bushing 31 is provided with a central bore 32 that receives the upper end of the rotatable member 21, the latter carrying a flanged head 33 provided with an upwardly disposed planar fin 35 (FIGS. 2 and 8). The lower surface of the flange 33 is formed with a bearing race 36 (FIG. 8) adapted to receive bearing means in the form of balls 37. The upper end of the bushing 31 is formed with a similar bearing race 39 about which the bearing balls 37 are adapted to move when the member 21 is rotated in the housing.

Disposed in the upper interior portion of the bore 26 is a universal joint means 40 that includes a ball 41 (FIGS. 5–7) which is provided with a pair of right angularly disposed slots 43 and 44 arranged on opposite sides of the ball. The lower slot 44 is adapted to slidably and snugly receive the fin 35 on the upper end of the rotatable member 21.

The housing 25 is provided with an upper narrowed section 25a in which a generally upwardly extending bore 51 is formed, the bore communicating at its lower end with the spheroidal portion 27 of the housing recess 26 while the upper end of the bore 51 extends to the exterior of the housing. Disposed in the bore 51 is the shaft portion 52 of a crank member 53 (FIG. 2), which includes an upper or crank portion 54 pivoted at 55 to the upper end of the shaft section 52. The lower end of the shaft section 52 is provided with a planar transverse fin 56 that slidably fits into the upper universal ball slot 43, as best shown in FIG. 2. As will be seen from FIG. 9, the transverse width of the fin 56 is substantially equal to the diameter of the shaft 52, so that the shaft section 52 may readily be inserted into or withdrawn from the bore 51, and when, as shown in FIG. 2, the shaft is inserted into the bore 51 and turned until the fin 56 enters the slot 43 of the ball 41, the latter and the fins 35 and 56 can act as a universal joint, transmitting rotary motion of the crank 54 to the rotatable member 21, nowithstanding the angularity between the axis of the shaft section 52 and the axis of the rotatable member 21. Thus, turning the crank 54 in one direction or the other serves to increase or decrease the effective length of the link 18, as best shown in FIG. 1.

The upper end of each link 18 is connected to the associated lift arm 17 by means affording a universal connection, that is, a connection that can permit swinging laterally as well as in a fore-and-aft direction, such connections usually being in the form of a ball and socket joint, incorporating a ball disposed in a spherical socket at the upper end of the lift link and a pivot connecting the ball just mentioned to the outer end of the lift arm 17. According to this invention, the ball 65 is of special construction functioning not only as a spherical connection between the upper lift link and the lift arm but also as a quick detachable connection and, second, as means normally holding the shaft section 52 in place in the bore 51. Such ball and socket connection will now be described.

The pivot pin 61 is of generally cylindrical construction, having removable means holding the pin in position. The pivot ball member is indicated at 65 and includes two half sections 66 and 67 of substantially identical construction, as best shown in FIG. 3. The two parts 66 and 67 are complementary one with respect to the other and together form a generally spherical pivot connection with the upper portion of the housing 25, which is formed with a generally spherical socket 69 shiftably receiving the ball 65. Each of the ball halves 66 and 67 is provided with an internal cylindrical bore 72, as best shown in FIG. 3, and when the bores 72 are disposed transversely of the head 25 (FIG. 2), they are adapted to receive the connecting pin 61. Arranged in this manner, the balls 66, 67 extend into the bore 51 (FIG. 2), as indicated at 75, and cooperate with a circumferential groove 76 formed in the shaft 52 so as to prevent the latter from shifting accidently upwardly out of the bore 51.

When it is desired to disconnect the upper end of the link 18 from the lift arm 17 and also disassemble the universal joint parts, the first step is to remove the pin 61 and then manually rotate the ball halves 66 and 67 into the position shown in FIGS. 3 (dotted lines) and 4. This will dispose the ball half 67 so that it is free to enter a laterally extending notch 78 formed in the lower portion of the upper end of the housing. This will permit the ball half 67 to move downwardly (FIG. 4) so that the part 67 is free to move laterally out of the socket section 69, as shown in dotted lines in FIG. 3. Thereafter, the other ball section 66 is also free to be shifted into the notch 78 and then out of the socket 69.

The crank shaft 54 may then be lifted directly out of the bore 51, the fin 56 moving out of the slot 43 (FIG. 2) and out through the bore 51. Next the bushing 31 is unscrewed and dropped down along the rotatable member 21, after which the housing 25 may then be lifted directly off the upper end of the member 21 and moved away from the universal joint ball 41. Reassembly may be effected by substantially a reverse of the steps just mentioned.

While I have shown and described above the preferred structure in which the principles of this invention have been incorporated, it is to be understood that my invention is not to be limited to the precise details shown and described above, but that, in fact, widely different means may be employed in the practice of the broader aspects of my invention.

What I claim, therefore, and desire to secure by Letters Patent is:

1. In a hitch device, a lift link structure comprising a pair of axially aligned relatively rotatable parts, a housing rotatably receiving the outer end of one of said parts, a crankshaft rotatably mounted for rotation in said housing, universal joint means enclosed in said housing and connecting said crankshaft with the adjacent end of the associated rotatable part, said housing having a pivot-receiving opening, a pivot disposed therein, and interengaging means on said pivot and said crankshaft.

2. In a tractor-carried power operated lift link mechanism adapted to be connected between a power-actuated lift arm and a part to be lifted, the combination of a housing normally disposed in a generally vertical position and having an upper pivot-receiving opening extending generally transversely and a lower axially extending recess open at its lower end, a shaft member having an end portion rotatably extending into said recess, the axis of the latter and said shaft when extended lying in the center of said pivot-receiving opening, said housing having a shaft opening extending at an angle to the axis of said recess, a crank shaft rotatably disposed in said shaft opening, and universal joint means disposed in the inner portion of said recess and connecting the inner end of said crankshaft and the inner end of said shaft member, said pivot-receiving opening being joined with said shaft opening, there being means on said shaft engaging a pivot member in said pivot-receiving opening.

3. In a tractor-carried power operated lift link mechanism adapted to be connected between a power-actuated lift arm and a part to be lifted, the combination of a housing normally disposed in a generally vertical position and having an upper pivot-receiving opening extending generally transversely and a lower axially extending recess open at its lower end, a shaft member having an end portion rotatably extending into said recess, the axis of the latter and said shaft when extended lying in the center of said pivot-receiving opening, said housing having a shaft opening extending at an angle to the axis of said recess, a crankshaft rotatably disposed in said shaft opening, universal joint means disposed in the inner portion of said recess and connecting the inner end of said crankshaft and the inner end of said shaft member, a rounded pivot member in said pivot-receiving opening extended partially into said shaft opening, and said shaft member having a circumferential groove formed therein and shaped to embrace the portion of said pivot member extending into said shaft opening.

4. The invention set forth in claim 3, further characterized by said pivot-receiving opening in the housing being of generally spheroidal internal configuration and said pivot member also being of generally spheroidal external configuration.

5. The invention set forth in claim 4, further characterized by said pivot member being formed of two complementary sections and said pivot-receiving opening having a notch extending to the exterior to accommodate removal of said sections one at a time from said recess.

6. In a hitch device, a lift link structure comprising a generally upright housing including an upper transverse pivot-receiving opening, a lower longitudinal opening, and a shaft-receiving opening extending upwardly through the housing from the upper portion of the longitudinal opening past the pivot-receiving opening in contiguous relation, a ball movably disposed in the inner portion of said longitudinal opening and having a pair of slots lying at 90° with respect to one another, the planes of said slots intersecting in the center of said ball and said center lying in the longitudinal axis of said lower opening, a rotatable member disposed axially in said lower opening and having a planar fin fitting freely axially slidably in one of said ball slots, a crank-operated shaft disposed in said shaft-receiving opening and including an inner end having a planar fin fitting freely axially slidably in the other of said ball slots, first means connected with the housing adjacent the shaft receiving opening and remote from the ball to normally hold the crank operated shaft from free axial movement, and second means connected with the housing adjacent the lower longitudinal opening to normally hold the rotatable member from free axial movement.

7. The invention set forth in claim 6, further characterized by said rotatable member having a head at its inner end carrying the associated fin, means on said head forming an outwardly facing bearing race, bearing means disposed thereagainst, and a flanged part rotatably receiving said rotatable member and having a screw threaded connection with the lower end of said housing and a bearing race cooperating with said bearing means.

8. A universal joint construction comprising a ball having a pair of slots formed in opposite sides, respectively, of said ball, said slots lying in planes normal to one another, a pair of angularly related parts interconnected through said ball, each of said parts including a generally planar axially extending transverse fin slidably disposed, respectively, in said slots, a housing enclosing said ball in a compatible recess and having a bore, smaller in diameter than the diameter of said ball-receiving recess, receiving one of said parts and the associated planar fin, means encircling the other of said parts and acting thereagainst for holding the fin of said other part in engagement with the associated slot in said ball, and means fixing said part-encircling means to said housing.

9. A universal joint structure as defined in claim 8, further characterized by means acting between said housing and said one of said angularly related parts for holding the latter in said bore.

10. A universal joint structure as defined in claim 8, further characterized by means releasably connected with said housing and acting between the latter and said one of said angularly related parts for detachably holding said one part in said bore.

References Cited by the Examiner

UNITED STATES PATENTS

| | | | |
|---|---|---|---|
| 670,748 | 3/1901 | Weddeler | 64—2 |
| 1,829,392 | 10/1931 | Caldwell | 64—16 |
| 1,866,714 | 7/1932 | King | 64—2 |
| 2,998,734 | 9/1961 | Bunting | 74—579 |

MILTON KAUFMAN, *Primary Examiner.*

BROUGHTON G. DURHAM, *Examiner.*